United States Patent [19]

Kelly

[11] Patent Number: 4,548,585

[45] Date of Patent: Oct. 22, 1985

[54] TEACHING AID FOR MATHEMATICS

[76] Inventor: Linda Kelly, 16951 Great Glen, Houston, Tex. 77084

[21] Appl. No.: 574,006

[22] Filed: Jan. 26, 1984

[51] Int. Cl.$^4$ ............................................. G09B 19/02
[52] U.S. Cl. ....................................... 434/195; 434/207
[58] Field of Search ............... 434/188, 190, 191, 195, 434/207

[56] References Cited

U.S. PATENT DOCUMENTS

| | | | |
|---|---|---|---|
| 1,836,870 | 12/1931 | Quer | 434/195 |
| 2,635,355 | 4/1953 | Thompson et al. | 434/195 |
| 2,663,096 | 12/1953 | McCurdy | 434/195 |
| 3,131,488 | 5/1964 | Slater | 434/195 |
| 3,204,343 | 9/1965 | Pollock | 434/195 |
| 3,229,388 | 1/1966 | Smith | 434/195 |
| 3,276,151 | 10/1966 | Smith, Jr. | 434/190 |
| 3,311,996 | 4/1967 | Bergener | 434/207 |
| 3,414,986 | 12/1968 | Stassen | 434/195 |
| 3,423,849 | 1/1969 | Jordan et al. | 434/188 |
| 3,514,873 | 6/1970 | Stobbe | 434/190 |
| 3,758,962 | 9/1973 | Bagdasar | 434/205 |

Primary Examiner—William H. Grieb
Attorney, Agent, or Firm—Mosely, Neal J.

[57] ABSTRACT

A mathematics teaching aid kit comprises a storage box, teachers manual, task cards, and manipulative components used to teach a mathematics program. The manipulative components comprise sets of individual thin rectangular and square plates or stair members of different colors divided into separate squares forming ten distinct shapes ranging from one square to ten composite multiple squares illustrating the numbers one to ten. The reverse side of the stair members is divided identically, but of different color or surface texture. The teaching components comprise square or rectangular tile members, some with positive numbers on one side and negative numbers on the other and others with arithmetic symbols printed on one side, and a pair of thin elongated rectangular members or number line bars, one divided into evenly spaced increments bearing positive numbers, and the other having identical increments and indicating negative numbers. A square frame or place holder represents unknown numbers, and a thin rectangular pointer bar having a different color on each side and one pointed end represents directional movement.

16 Claims, 57 Drawing Figures fig.1 fig.2 fig.3A fig.3B fig.3C fig.4A fig.4B fig.4C fig.5A fig.5B fig.5C fig.5D fig.6A fig.6B fig.6C fig.6D fig.6E fig.6F fig.6G fig. 7A fig. 7B fig. 7C fig. 7D fig. 7E    fig. 7F fig. 8 fig. 9A fig.9B

OR: 5 = 9 - □ fig.9D fig.9C fig.9E fig.9F fig.9G fig.9H fig.9J fig.10A fig.10B fig.10C fig.10D fig.10E fig. 11A fig. 11B fig. 11C fig. 12A fig. 12B fig.12C fig.12D fig.12E fig.12F fig.12G fig.14 fig.15 fig.13A fig.13B fig.13C fig.13D fig.13E

TEACHING AID FOR MATHEMATICS

BACKGROUND OF THE INVENTION

1. Field of the Invention

This invention relates to aids for teaching mathematics, and more particularly to a teaching aid for mathematics in kit form comprising a storage box, teachers manual, task cards, and manipulative components used therewith to teach a complete mathematics program from simple counting to complex equations.

2. Brief Description of the Prior Art

There are several patents which disclose block type mathematical teaching aids. Most of the prior art is limited to teaching simple arithmetic concepts of addition and subtraction of positive real numbers and does not provide a complete mathematics program of teaching relationships and operations between quantities or the methods by which they are deduced.

Quer, U.S. Pat. No. 1,836,870 discloses an educational game for teaching arithmetic comprising a base board having compartments and a series of interfitting block members having individual values of less than ten and when properly interfitted within the compartments have a total numerical value of ten.

Thompson, U.S. Pat. No. 2,635,355 discloses an educational enumeration block assembly comprising a set of ten blocks bearing numbers from one to ten and graduating in heights accordingly. The blocks are scored circumferentially according to their numeric value. They may be stacked vertically or arranged laterally to demonstrate the concepts of addition, subtraction, multiplication, and division.

McCurdy, U.S. Pat. No. 2,663,096 discloses an educational toy comprising a set of ten blocks graduated in unit lengths from one to ten and bearing numbers accordingly. The blocks are differentiated according to their numeric value by slots on all four sides. The blocks may be stacked in various arrangements against a check sheet having a picture of a side view of the blocks arranged in unitary decremental layers for comparison thereto.

Pollock, U.S. Pat. No. 3,204,343 discloses apparatus for teaching or studying mathematics comprising a set of differently colored cuboid and rod like elements graduated in unit lengths according to their numeric value.

Stassen, U.S. Pat. No. 3,414,986 discloses a visual teaching aid comprising a set of numbered blocks each having a cubic size proportional to a number affixed thereto and a base member. The blocks are adapted to be stacked on the base member or each other and may be arranged vertically or laterally to teach the concept of sets of numbers.

Bergener, U.S. Pat. No. 3,311,996 discloses a stairstep device for teaching numbers comprising a structure of ten steps of different colors and ascending in height from units of one to ten. The steps are provided with a handrail and may be arranged in a single ascending straight line or alternatively arranged to make a right angle turn at the middle step. The steps provide a method for teaching the structure of numbers and mathematics wherein a child physically claims the steps.

The prior art in general, and none of these patents in particular, discloses the present teaching aid kit comprising a storage box, teachers manual, set of task cards, and a set of manipulative components used therewith to teach a complete mathematics program.

SUMMARY OF THE INVENTION

It is therefore an object of the present invention to provide a comprehesive mathematics teaching program in kit form.

Another object of this invention is to provide a visual teaching aid which is tangible and easily understood.

Another object of this invention is to provide one piece of tangible teaching material that can be used by all children.

Another object of the invention is to provide one manipulative teaching aid that can do most basic math functions involving addition and subtraction of positive and negative numbers.

Another object of this invention is to provide a manipulative teaching aid which may be used by deaf and visually handicapped children.

Another object of this invention is to provide a method of teaching difficult mathematical concepts in a manner that children will enjoy.

Other objects of the invention will become apparent from time to time throughout the specification and claims as hereinafter related.

The above noted objects and other objects of the invention are accomplished by a teaching aid kit comprising a storage box, teachers manual, set of task cards, and a set of manipulative components used therewith to teach a complete mathematics program. The manipulative components comprise sets of individual thin rectangular and square plates or stair members of different colors divided into separate squares forming ten distinct shapes ranging from one square to ten composite multiple squares illustrating the numbers one to ten. The reverse side of the stair members is divided identically, but of different color or surface texture. The teaching components comprise square or rectangular tile members, some with positive numbers on one side and negative numbers on the other and others with arithmetic symbols printed on one side, and a pair of thin elongated rectangular members or number line bars, one divided into evenly spaced increments bearing positive numbers, and the other having identical increments and indicating negative numbers. A square frame or place holder represents unknown numbers, and a thin rectangular pointer bar having a different color on each side and one pointed end represents directional movement.

DESCRIPTION OF THE PREFERRED EMBODIMENT

Figure 1:
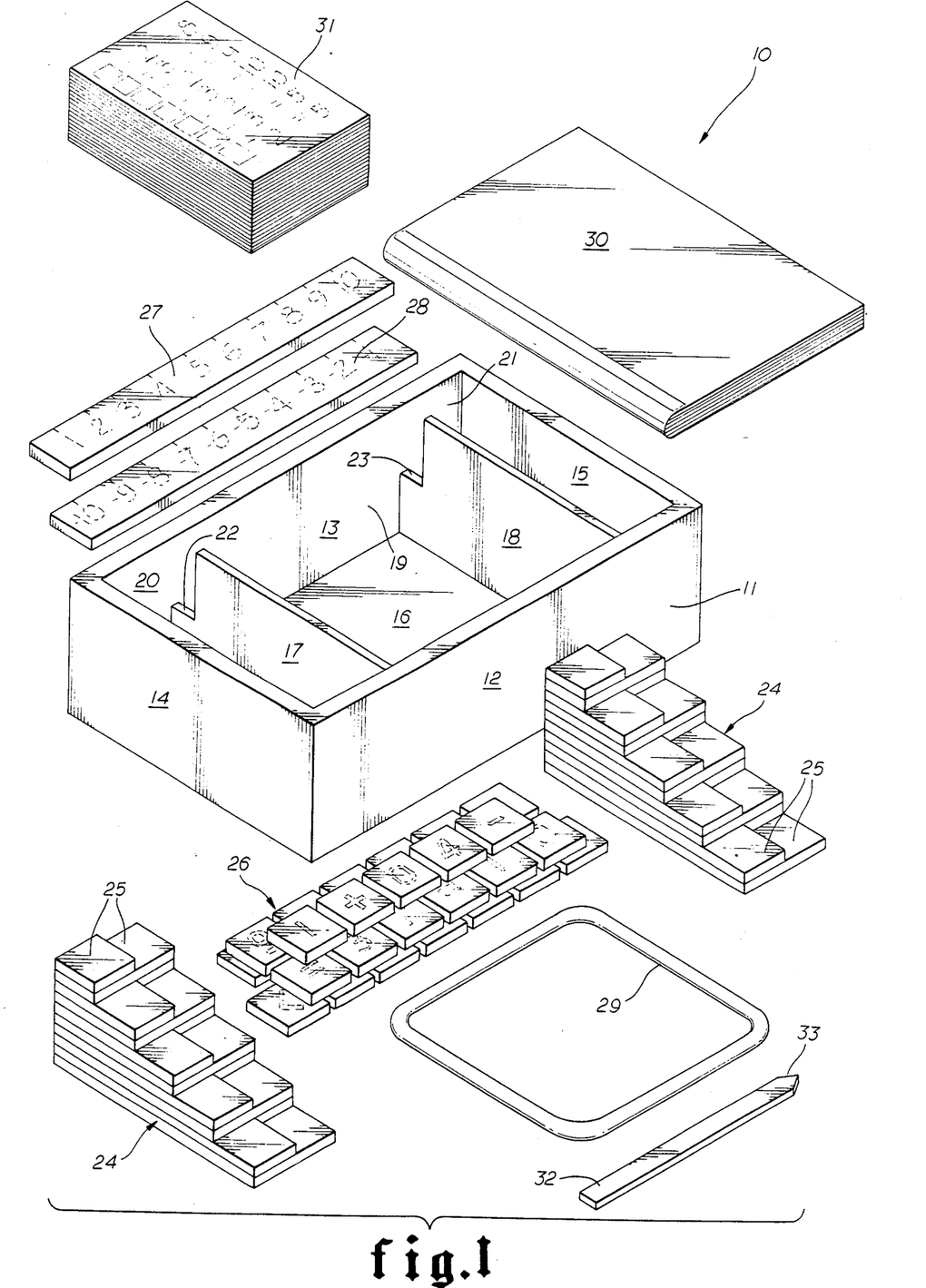
FIG. 1 is an isometric view of the kit of materials in accordance with the present invention.

Referring to the drawings by numbers of reference, and more particularly to FIG. 1, there is shown a preferred teaching aid 10 for mathematics in kit form. The teaching components may be contained in a rectangular box 11 having an open top and lid, side walls 12 and 13, end walls 14 and 15, and a bottom 16. Transverse upright dividers 17 and 18 spaced from the end walls 14 and 15 form a generally square center compartment 19 and adjacent rectangular compartments 20 and 21. Dividers 17 and 18 are provided with vertical slots 22 and 23 spaced from the side wall 13.

Figure 2:
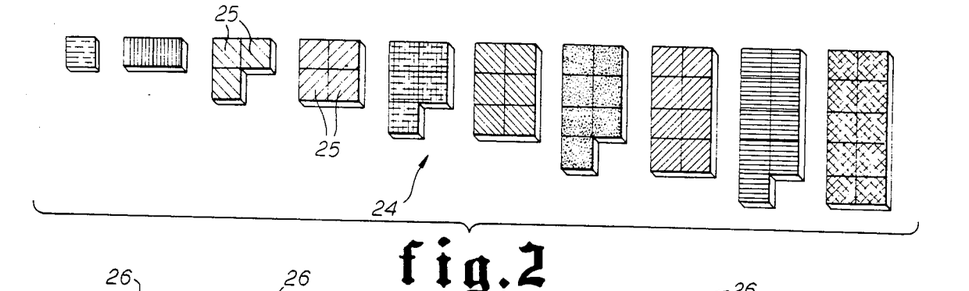
FIG. 2 is a plan view of one set of the rectangular and square plate members of the present invention.

The teaching components comprise two sets of individual thin rectangular and square plate members of wood, molded plastic, pressed cardboard, or the like, hereinafter referred to as "stairs" 24 (FIGS. 1 and 2). The stairs 24 may be magnetic to secure them together in certain teaching functions. The plates or stairs 24 are scored or marked to divide them into separate squares 25 forming ten distinct shapes ranging from a single square to ten composite multiple squares for illustrating the numbers from one to ten. The squares 25 are arranged in double rows for use in teaching the concept of odd and even numbers. The stairs 24 when used in combination serve as teaching aids for teaching addition and subtraction and various other mathematical concepts.

The various stairs 24 are each of a different color for each number. This makes it easier for the child to keep the numbers in mind. The reverse side of each of the stairs 24 is of a different color or surface texture from the front side. In addition, the reverse side is scored or marked to divide the stair into separate squares in the same manner as the front of the stair. This makes it possible to use the front side of the stairs for demonstration of addition and of positive numbers and the reverse side of the stair for a demonstration of subtraction and of negative numbers.

The teaching components also comprise a series of individual square tile members 26 having numbers and arithmetic symbols printed on them. A positive number from one to ten is printed on one side of the numeral tiles, and a negative number from one to ten is printed on the reverse side. The kit 10 also includes a pair of thin elongated rectangular members or number line bars 27 and 28 similar in appearance to rulers. Number line bar 27 is divided into evenly spaced increments bearing positive numbers from one to ten. Number line bar 28 has identical increments and bears negative numbers from one to ten.

The kit 10 further includes a square frame or place holder 29 for representing unknown numbers, a teaching manual 30 for instructing teachers in the application and use of the materials, printed worksheets or task cards 31 having mathematical problems for teaching the concepts taught by the materials, and a thin rectangular pointer bar 32 having one color, e.g. black, on one side for use when teaching the positive number line, and another color, e.g. red, on the other for use when teaching the negative number line and a pointed end 33 representing directional movement.

When the kit 10 is stored, each set of stair members 24 is housed in the rectangular compartments 20 and 21, and the group of individual numeral and symbol tiles 26 are housed in the center compartment 19 along with the place holder 29 and the pointer bar 32. The pair of elongated rectangular number line bars 27 and 28 are placed into the slots 22 and 23 in the dividers 17 and 18.

METHOD OF USE

The teaching components are designed to accompany a series of lessons and sets of task cards to sequentially teach a complete mathematics program from simple counting to complex equations. The following series of lessons are presented to illustrate the relationship of the components therewith and as a brief overview of the teaching method. The components in FIGS. 3A through 15 are illustrated schematically to accompanying the particular lesson being described.

Figure 3A:
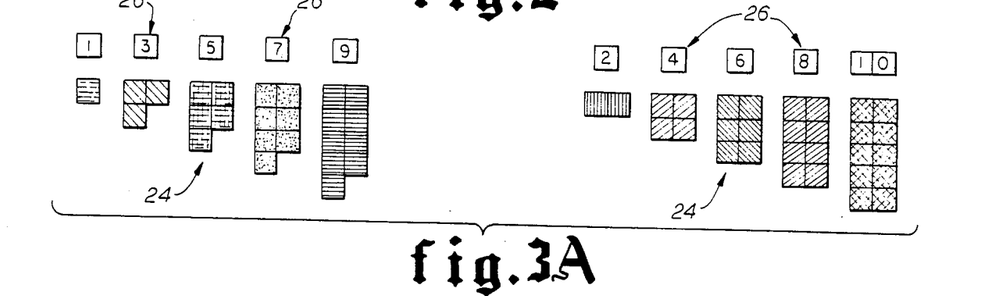
FIGS. 3A–3C are plan views illustrating schematically how the components are used to teach the concept of odd and even numbers and the concept of joining sets.
Figure 3B:
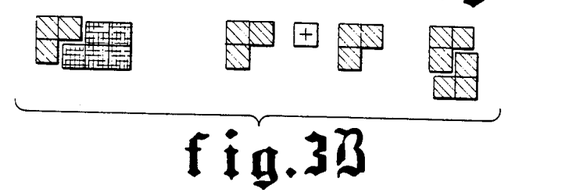

Lesson one is an introduction to odd and even numbers and will help the child understand that an odd number plus an odd number will always make an even number and that odd plus even makes odd. Referring now to FIGS. 2 and 3A through 3C, the stairs 24 are laid out from one to ten and the child is asked to group the stairs into odd and even numbers (FIGS. 3A). The child is asked to match the numeral tiles 26 to the corresponding stair. The child is instructed to put any two odd stairs together like a puzzle and asked what kind of number he made (FIG. 3B). He is then asked to lay one square one top of the other to try the odd and odd combinations. The above process is repeated for teaching even and even combinations and odd and even combinations.

Figure 3C:
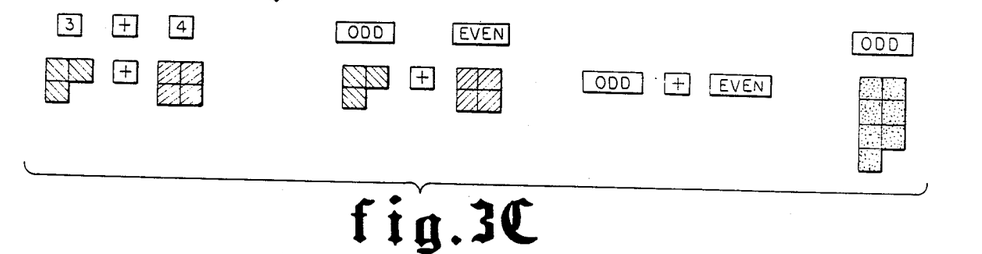

To teach the child that the plus (+) sign means to "put together", the stairs are matched to the numerals and then the stairs are labeled odd or even. The child is asked to do what the plug sign means and to label the resulting number odd or even (FIG. 3C). When the child can complete this task alone, he is ready to complete the corresponding task cards.

Figure 4A:
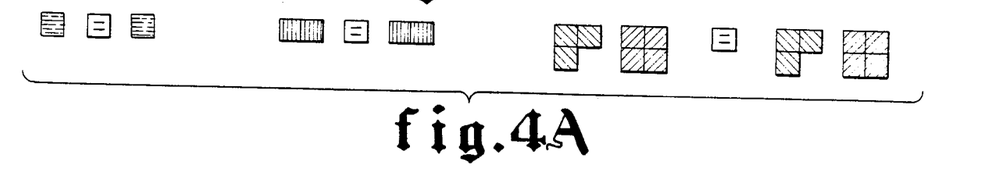
FIGS. 4A–4C are plan views illustrating schematically how the components are used to teach the concept of equations and the concept of equality and inequality.

Lesson two (FIGS. 4A through 4C) will help the child understand that the equal (=) sign means "the same as" and the concept of equality and inequality. The child is told that an equation is being made and that both sides of the equation have to be exactly the same. The equal sign is laid down and several matching stairs are placed on each side of it (FIG. 4A). The child is then allowed to become involved in balancing the equation. The child is then asked to close his eyes and find the stairs to balance the equation.

Figure 4B:
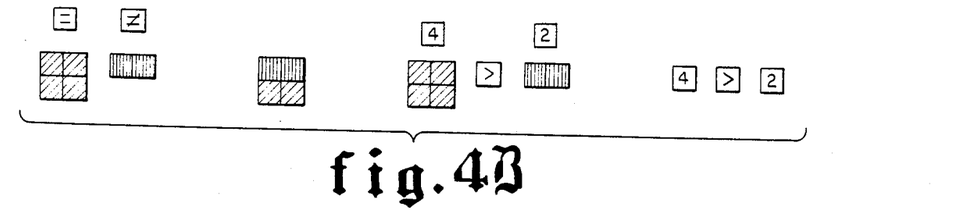
Figure 4C:
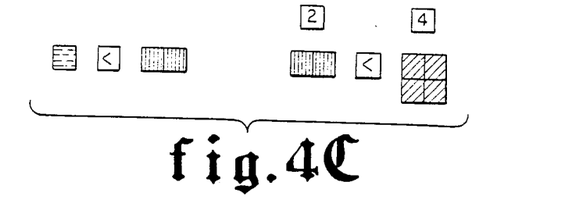

After the child understands the concept of equality, two different stairs are laid down and the child is asked if they are equal or unequal (FIG. 4B). Then the child is shown which number is more or greater by laying the stairs on top of each other. The child is shown the "greater than" sign and shown how the lines are opened wider towards the greater number. Two numeral tiles are laid out keeping the greater number first. The above process is repeated using the "less than" sign (FIG. 4C). The child is asked to verbalize the process each time. For example, "ten is greater than nine, one is less than two", etc. The child is to complete the task cards by copying the problems, stacking the stairs on the written numbers, placing the sign, and then verbalizing the process.

Figure 5A:
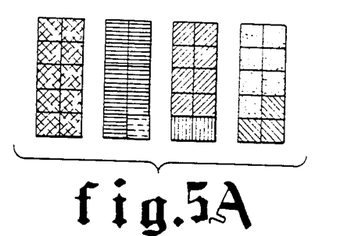
FIGS. 5A–5D are plan views illustrating schematically how the components of numbers are used to teach the concept of sums, expressing numbers in other ways, and proving that equations are in balance.
Figure 5B:
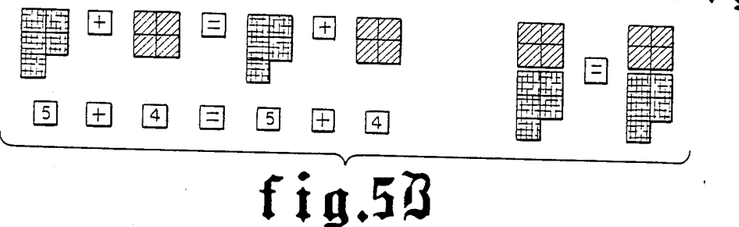

Lesson three (FIGS. 5A through 5D) teaches the sums to ten and how numbers may be expressed in different ways. A ten stair is laid out (FIG. 5A) and the child is asked the name of the number. After the child responds with the number ten, he is told that there are other ways of saying ten. A nine stair is laid on top of the ten and the child is told "we can say ten, or we can say nine and one". The child is shown other ways of saying ten by laying other stairs on top of the ten stair. After this exercise, the concepts of equal, plus, and equations are reviewed and practiced.

Figures 5C, 5D, 6A:
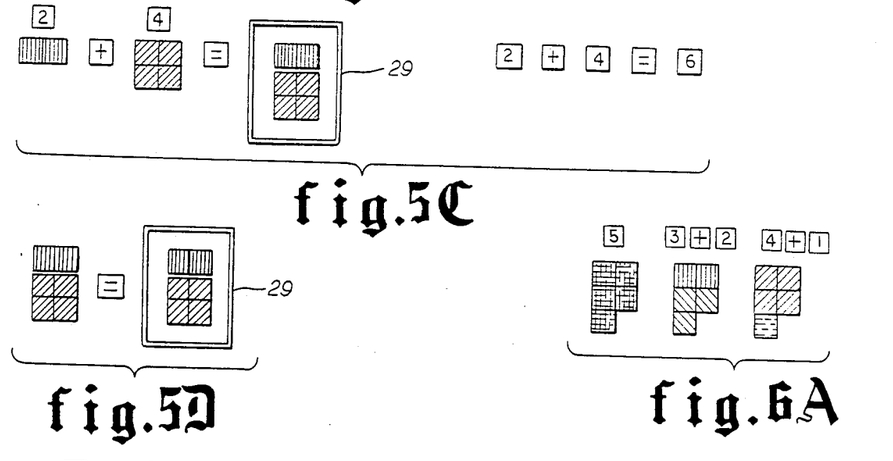
FIGS. 6A–6G are plan views illustrating schematically how the components are used to teach the concept of components of numbers and finding missing numbers.

The child is shown the place holder 29 and told that it holds the place for the unknown number. A new equation is made with the numeral tiles (FIG. 5B), and a blank numeral tile is used for the place holder. The child solves the equation using the appropriate numeral squares and the place holder (FIG. 5C). The child proves the equation is in balance by arranging the stairs into matching patterns (FIG. 5D), and then proceeds with the task cards.

Figure 6B:
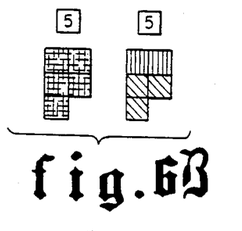
Figure 6C:
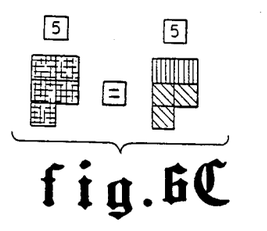
Figure 6D:
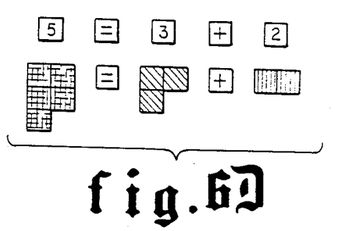
Figure 6E:
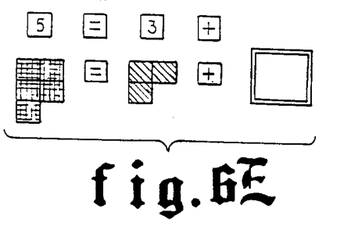
Figure 6F:
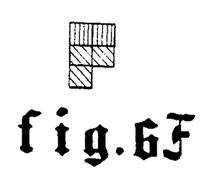
Figure 6G:
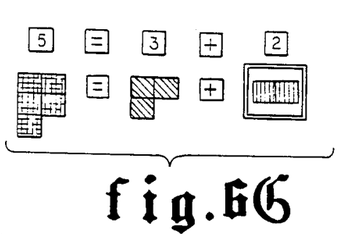

Lesson four (FIGS. 6A-6G) teaches the components of numbers and is an introduction to finding missing numbers. A stair is chosen to be expressed in other terms. Other stairs equal to or less than the number are laid on top of it to find ways of expressing it (FIG. 6A). The components of the number are removed and the child is shown how the two stairs or numbers are joined together similar to using the plus sign (FIGS. 6C and 6D). The child is told "to make five we used three plus two. Three plus two equals five" (FIG. 6B). The child is then shown the task cards and what has been done to them so that he can proceed on his own.

Figure 7A:
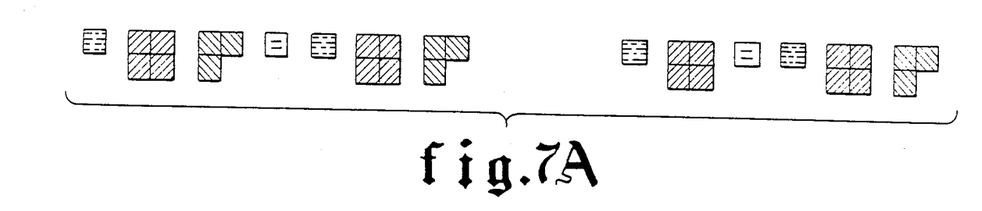
FIGS. 7A-7F are plan views illustrating schematically how the components are used to teach the concepts of missing addends, multiple addends, and balancing equations.
Figure 7B:
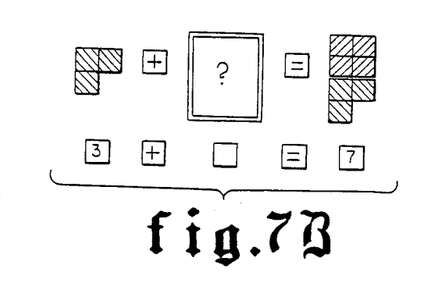
Figure 7C:
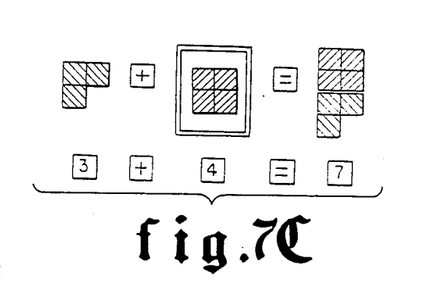
Figure 7D:
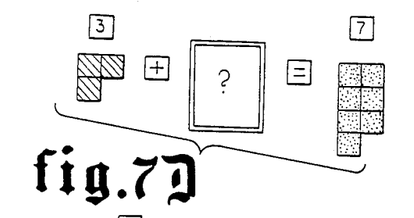
Figures 7E, 7F:
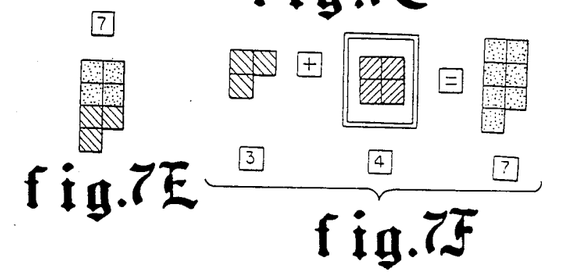

Lesson five (FIGS. 7A-7F) teaches missing addends. An equation is laid out (FIG. 7A) and the balancing of equations is reviewed. After an equation is in balance, a stair is taken away on either side of the equation and the child is asked to tell what number is needed to keep the equation in balance. A new equation is laid out (FIG. 7B), and the child is told "we need to combine another number with three to make seven". The child should see that it is four. The seven that was expressed by a three and a four is replaced with a seven stair (FIG. 7D). The four is removed and the child is told "we need to combine another number with three to make seven." The three is stacked on top of the seven so the child can see how to solve for the missing addend (FIG. 7E). This process is repeated until the child is able to stack the addend onto the sum to find the missing addend on his own. Next, the child is given an equation with a missing added and a replaced sum. Then the numeral tiles are used with a blank tile as a place holder. When the child can solve the equation on his own, he is ready for the task cards.

Lesson six (FIG. 8) teaches subtraction by taking away squares from a quantity such as ten. The child is shown the minus sign (−) and told that it is used to take away quantities like the action of your arm as you remove quantities. The child is shown one of the stairs and how it is impossible to remove any squares because they are all connected. The child is told "we can take away squares from this number by covering up the amount of squares we want to remove," and then the number of squares taken away is flipped over. The child should first be shown how to take away one, two, three, etc, then asked what number is being expressed when the squares are removed.

Figure 8:
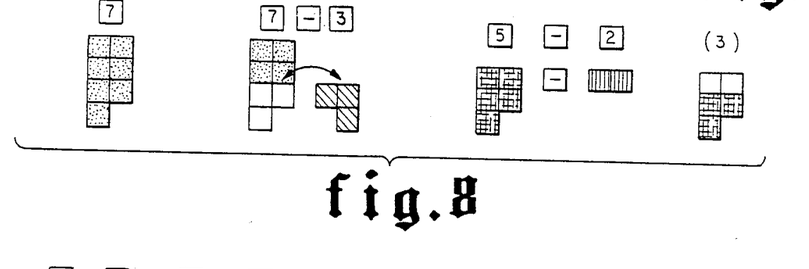
FIG. 8 is a plan view illustrating schematically how the components are used to teach the concept of subtraction.

After this exercise, the child is ready for equations. The equation five minus two equals three is set up. The child should know how to balance the equation. If not, show how five minus two equals five minus two, and asked how two is taken away from five. The equation can be proved by subtracting two from each side of the equation. Numerical commands using the tiles should be given before the child proceeds with the task cards.

Figure 9A:
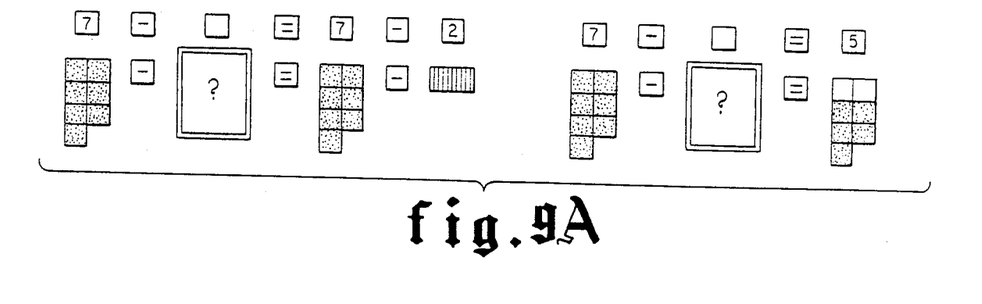
FIGS. 9A-9H are plan views illustrating schematically how the components are used to teach the concept of missing subtrahends and minuends, and proving equations.
Figure 9B:
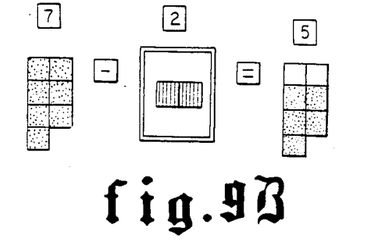
Figure 9C:
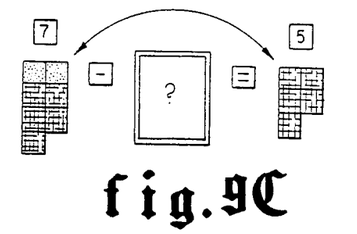
Figure 9D:
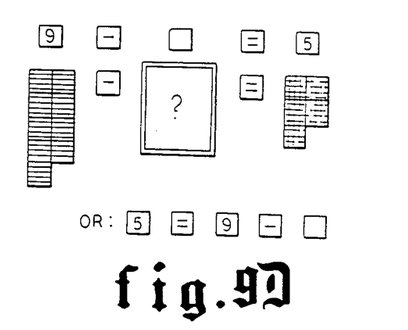
Figure 9E:
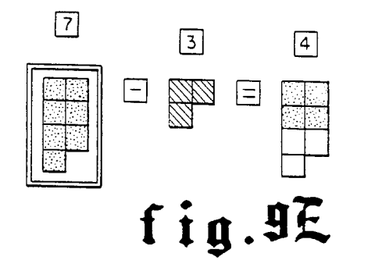

Lessen seven (FIGS. 9A-9H) teaches missing subtrahends and minuends. The equation seven minus blank equals five (seven stair with a two on top) (FIG. 9A). The child should be able to tell what the missing subtrahend is. If he has difficulty, show him that seven minus blank equals seven minus two. The child is asked what number is being expressed by seven minus two. The missing subtrahend is cleared and the number being expressed by the seven minus two is replaced by the five stair (FIG. 9C). The child is told "we have seven and we need to take something away which will leave us with five." The five should be stacked on top of the seven to show clearly what has to be removed. This exercise should be practiced until the child knows how to find the missing subtrahend. Next tell the child that an equation is being set up with the replaced number first (FIG. 9D), and set up nine minus blank equals five. The child is asked to verbalize the equation, then it is solved and proved.

Figure 9F:
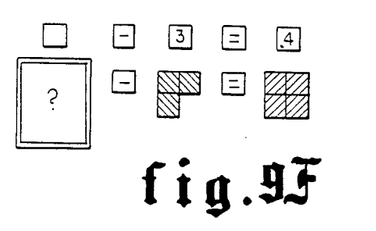
Figure 9G:
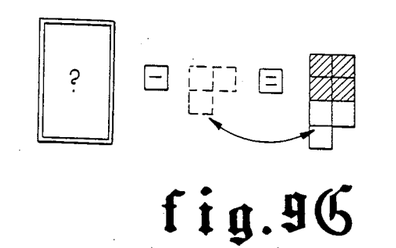
Figure 9H:
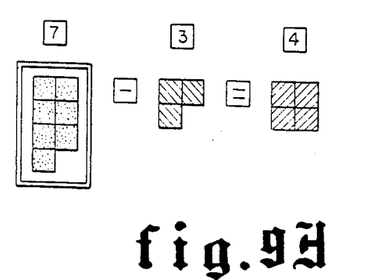
Figure 9I:
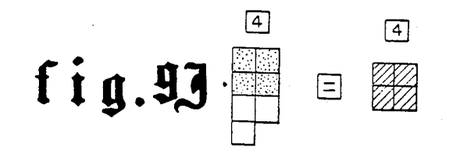

For the missing minuend, the equation blank minus three equals four (seven stair with the three turned over on top) is set up (FIG. 9E), and the child is told "we need to take three away from an unknown number and when we do we will have four left." (FIGS. 9F and 9G). The child should be able to tell from the equation that the missing minuend is seven. The child is told "we need to take away three (the three stair is flipped over) from an unknown number so we will be left with four." The three stair is placed next to the four so the child sees a total of seven squares. The child then proves that the equation is in balance by performing the operation 7−3, as in FIGS. 9H and 9I. This exercise should be practiced until the child can verbalize the process, and followed with numeral tiles before completing the task cards.

Figure 10A:
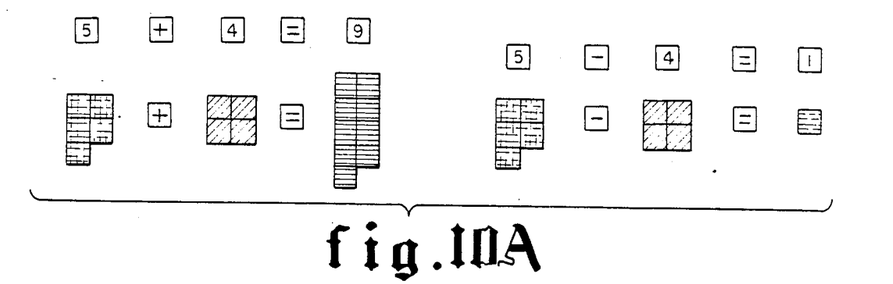
FIGS. 10A-10E are plan views illustrating schematically how the components are used to review the concepts of addition and subtraction, and relating addition to subtraction.
Figure 10B:
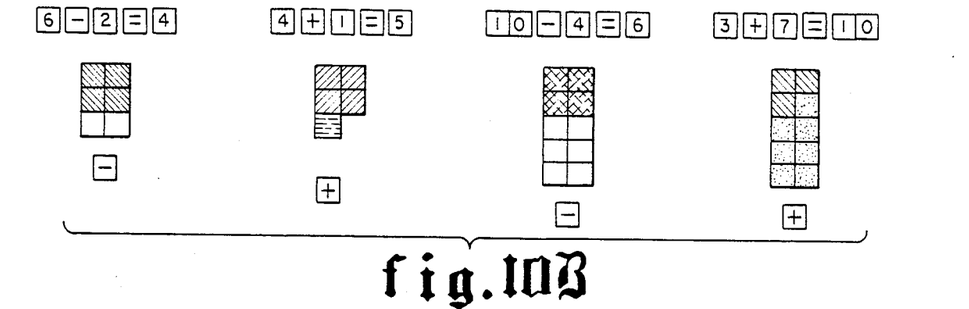

Lesson eight (FIG. 10) reviews the concept of addition and subtraction. The child is told that the plus sign is used when adding to find the sum of numbers, and the minus sign is used when subtracting to find the difference between numbers. The sum is demonstrated by putting the stairs together, and the difference by turning over the subtracted number stair. The equation $5+4=9$ is set up. The equation $5-4=1$ is also solved by the child. (FIG. 10A) The child is told the plus (+) gives us a sum of numbers and the minus (−) gives us the difference of numbers. The child is shown a series of expressions, in FIG. 10B, and asked to pick out the correct sign to use. The child also makes up the equation that the numbers expressed. He could also make up a story about the numbers.

Figure 10C:
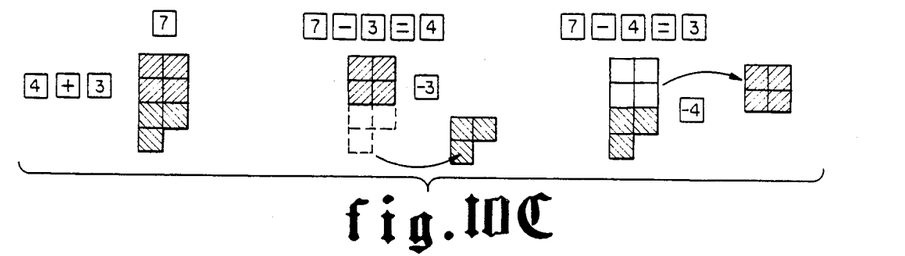
Figure 10D:
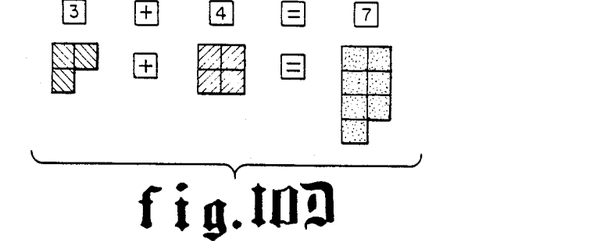
Figure 10E:
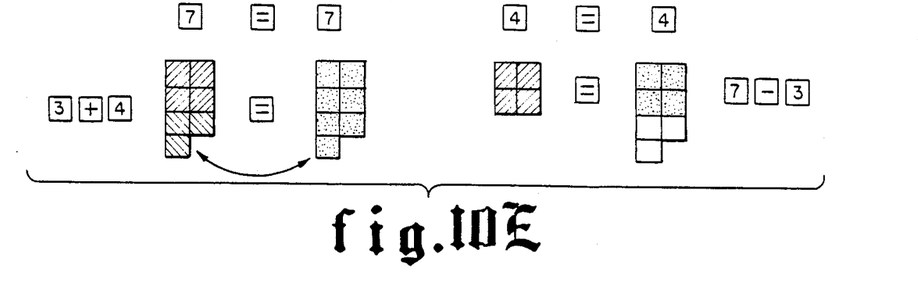

To relate addition to subtraction, the child is shown the number seven (7) composed of two numbers, three (3) and four (4). He is asked how the number seven (7) was made, and then shown how to subtract from the seven (7) by taking away either the three (3) or the four (4). (FIG. 10C). The equation $3+4=7$ is set up and proven. (FIGS. 10D and 10E). The child is told that the equation will always stay in balance if they always do the same thing on both sides of the equation. If three (3) is removed from one side of the equation, then three (3) must be removed from the other side of the equation to keep it in balance. (FIG. 10E). The child can clearly see that $4+3=7$ in FIG. 10E (left), and $4=7-3$ in FIG. 10E (right).

Figure 11A:
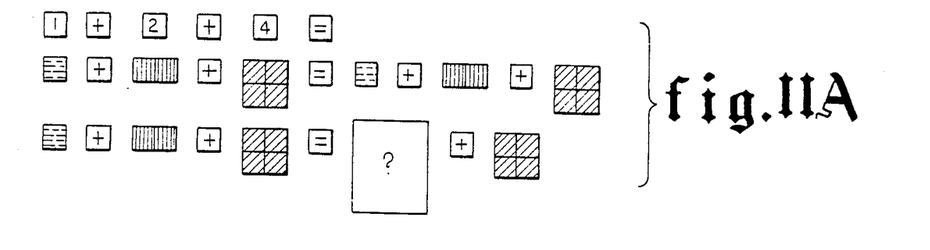
FIGS. 11A-11C are plan views illustrating schematically how the components are used to teach the concept of the associative properties of numbers.

Lesson nine (FIGS. 11A through 11C) teaches associative property. The equation one plus two plus four equals blank is set up (FIG. 11A) and the child is asked to balance the equation with the stairs. The child is then asked to close his eyes while the one and two stairs are removed and replaced with the place holder. The child is asked what number is missing and after responding with "one and two" is asked what number one and two expresses. A three stair is placed in the place holder and the child is told that one plus two plus four is equal to three plus four. The equation is then proved to be in balance.

Figures 11B, 11C:
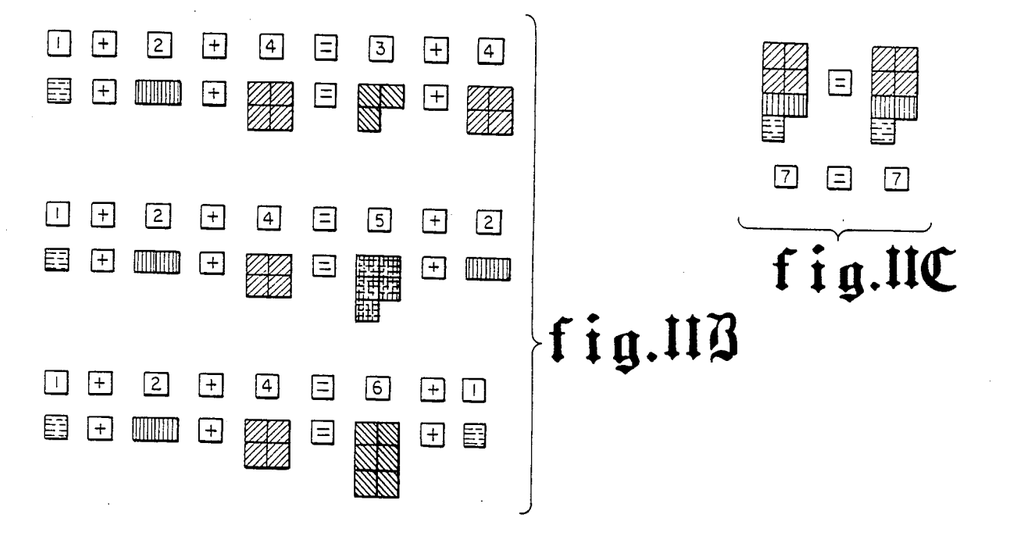

The original equation is again set up and the one and the four stairs are removed (FIG. 11B). The above exercise is repeated and then repeated again using the two and four stairs. The child is told that numbers are like people and associate with each other then shown how the the one associated with the two and became three plus four. Then the child is shown how the one associated with the four and became five and two. Finally, the child is shown how the four and two associated together to make six and one and how the equation remained in balance (FIG. 11C).

Figure 12A:
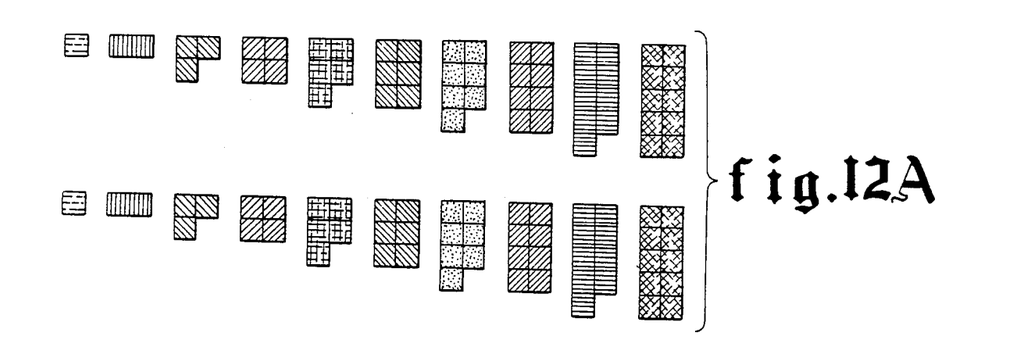
FIGS. 12A-12F are plan views illustrating schematically how the components are used to teach the concept of the number line and the relationship that directional movement has to addition and subtraction.
Figure 12B:
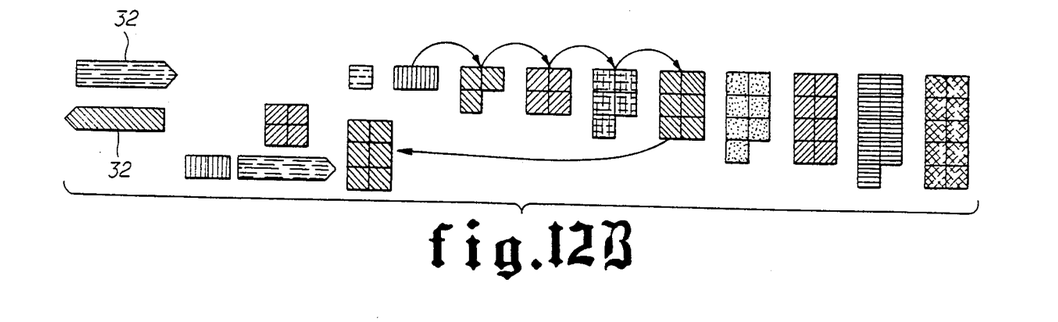
Figure 12C:
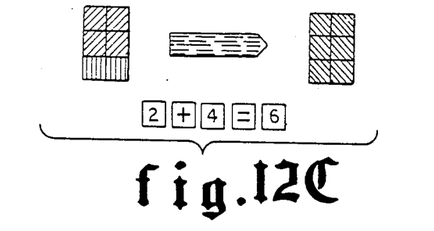
Figure 12D:
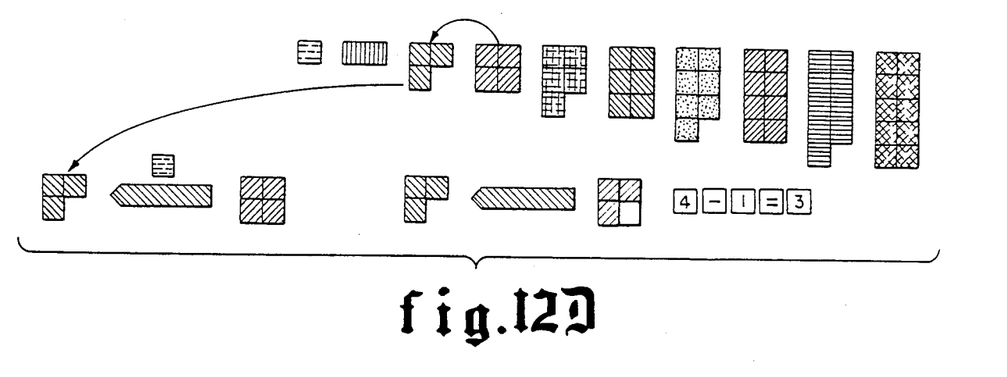

Lesson ten (FIGS. 12A-12G) teaches the number line. Two sets of stairs are laid out about ten inches apart (FIG. 12A) and the child is told that a line of numbers of a "number line" is being laid out. The child is shown the black side of the pointer 32 (FIG. 12B). The red side is used for the negative number line. The child is instructed on the direction of the pointer and told that a game will be played and he will be told what number to start on and then how many hops to go in the direction of the pointer. Each hop will be a new number. One set of stairs is used for commands and another set for the number line. The child is shown how he is doing addition and the exercise is repeated four or five times (FIGS. 12B and 12C).

Figure 12E:
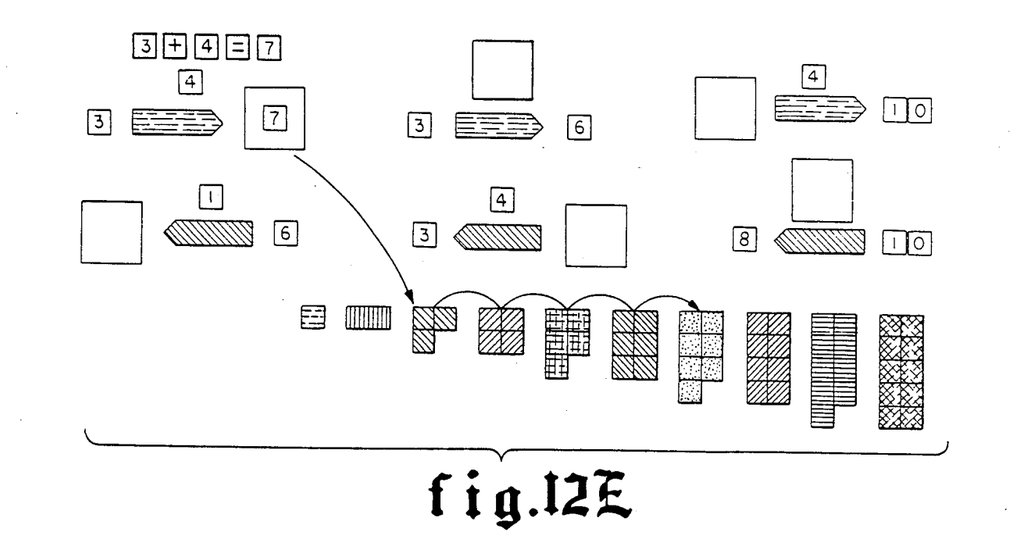
Figure 12F:
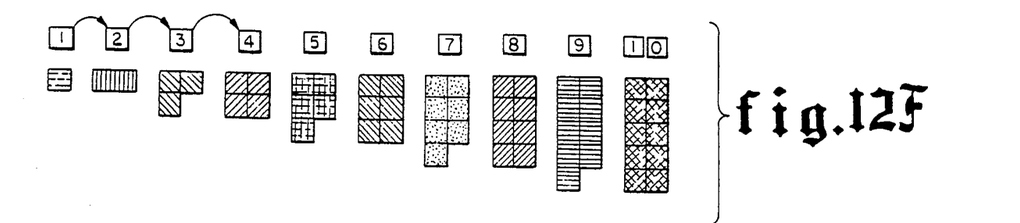
Figure 12G:
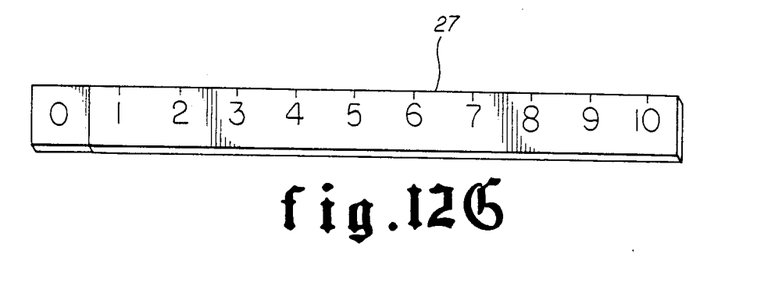
FIG. 12G is a plan view of one of the number line bars of the present invention having a zero tile placed at one end.

The direction of the pointer is changed and the child is shown how subtraction is being done. The child should conclude that when we go to the right we always add and when we go to the left we always subtract. After the child understands the relationship that direction has to addition and subtraction, compare the stair commands to the numerical commands (tiles). (FIG. 12E). Next, the child completes the task cards using the stair number line. He can use the pointer to remind him which way to move his number line. After completing the task cards compare the numerals to the number line and have the child solve problems by hopping on the numerals (FIG. 12F). The child is shown the wooden number line bar 27 in the box. A zero numeral tile is placed in front of it and the task cards are repeated again (FIG. 12G).

Figure 13A:
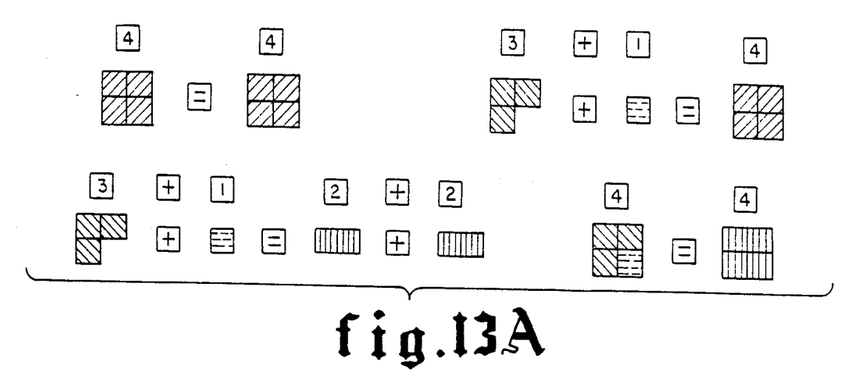
FIGS. 13A-13E are plan views illustrating schematically how the components are used to teach more advanced concepts of balancing and solving equations.
Figure 13B:
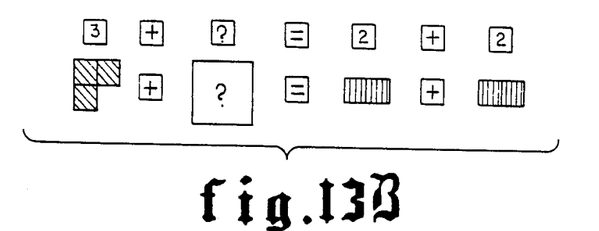
Figure 13C:
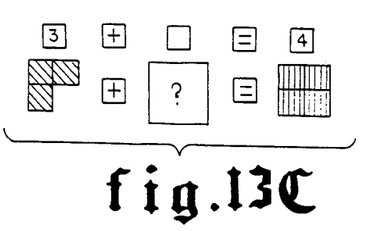
Figure 13D:
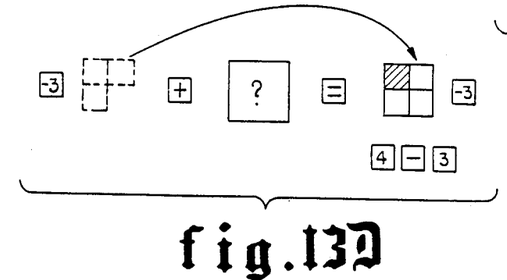
Figure 13E:
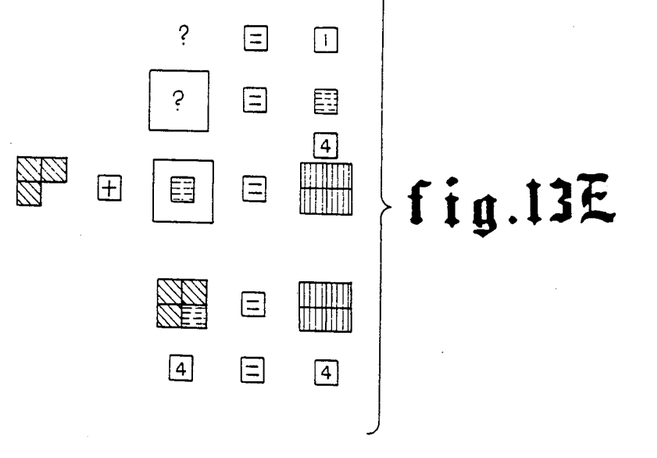

Lesson eleven (FIGS. 13A-13E) is a more advanced exercise in solving equations. The child is shown how to make a simple equation, $4=4$, more complex, $3+1=2+2$. (FIG. 13A). The concept that equations always remain in balance is reviewed with the child and proven each time. The child simplifies the equation first and must remove all the numbers except the unknown from one side of the equation. He must always subtract the same numbers from both sides of the equation to keep the equation in balance and to solve for the unknown number. (FIGS. 13B-13E). When the child needs to solve for equations that have a missing subtrahend, he must add the unknown to both sides of the equation to find the positive number. The child uses the task cards to set up the equation. He simplifies the equation, solves for the unknown, and then proves the equation by setting up the equation again with the unknown known. The equation should be in balance.

Lesson twelve (FIG. 14) teaches sums and differences over ten. The concept of bases is taught using stairs that can be loose or connected. The child is shown the numeral five and told "from now on we can not say the number five. We are going to 'bleep' number five away. When we count and come to number five, we aren't going to say five, instead we are going to say 'bleep'." The stairs are then counted in the following manner: "one, two, three, four, bleep." After saying "bleep", the child is told to bleep the stairs together (connect them). This process is continued but stopped before five bleeps.

Figure 14:
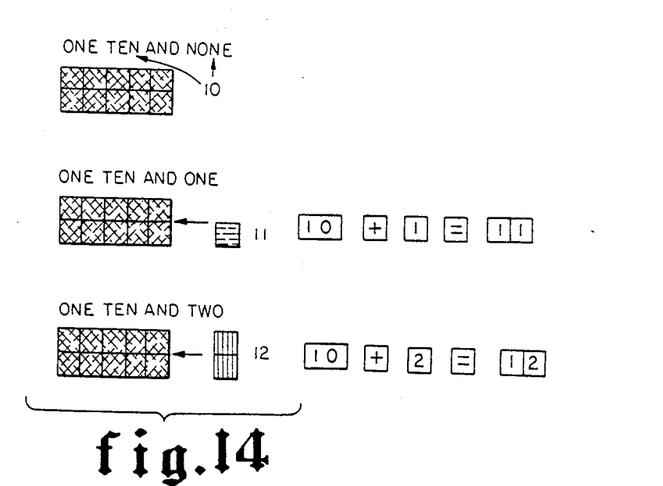
FIG. 14 is a plan view illustrating schematically how the components are used to teach the concepts of bases, teens, and sums and differences.

Count in the other bases the same way through to base ten by "bleeping" out the base number. After completing base ten, explain that that is the way we count in our number system. The number that comes after nine is always bleeped, but instead of "bleep", we say "ten." Ten is really "one bleep and none." The numeral ten (10) is twice as wide as the numerals from zero (0) to nine (9) so that the units can be placed on top of the zero (10) to show the place value visually.

Teens are taught using the "bleep" concept. One bleep and none is the same as the one ten and none. One bleep and one is the same as one ten and one which is eleven. One bleep and two is the same as one ten and two which is twelve. This process is continued through twenty. The child is asked to find which teens are odd and which are even. The bleeps do not determine odd and even. All the ways of expressing "one bleep" (ten) are reviewed with the child. Then all the numbers are doubled, and the child will discover that the doubles are all even numbers. When adding, the child is instructed to stack a ten stair over any two stairs that are over ten when added. This is a fast way to compute, and it also aids the child in abstracting our number system. When subtracting the child is to build the minuend using teens. The task cards include equal and unequal problems. The child computes each side of the equation and then places the correct sign between them.

Figure 15:
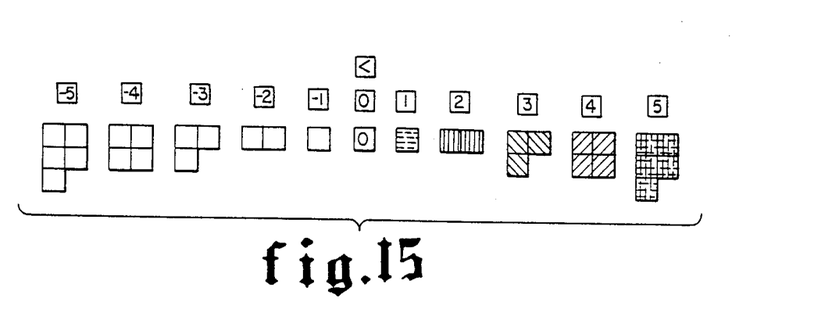
FIG. 15 is a plan view illustrating schematically how the components are used to introduce the concept of positive and negative numbers.

Lesson thirteen (FIG. 15) teaches negative numbers. A zero numeral tile is placed in the center of the workspace and the child is told that numbers more than (greater than) zero are called positive numbers. He is told "one more than zero is positive one, two more than zero is positive two" and the process is continued to positive ten. The child is then told that numbers less than zero are called negative numbers. He is told "one less than zero is negative one, two less than zero is negative two" and the process is continued to negative ten.

In this system of teaching, using the apparatus and technique of this invention, there is includes the addition and subtraction of positive and negative numbers, as well as solving for "n" rather than the "blank". Consequently, all of the above applications can be made to solving algebraic equations in a concrete and clear manner.

While this invention has been described fully and completely with special emphasis upon a preferred embodiment, it should be understood that within the scope of the appended claims the invention may be practiced otherwise than is specifically described herein.

I claim:

1. A kit of materials for teaching mathematics comprising two identical sets of individual thin flat rectangular and square plate members of appreciable thickness each bearing a different color and having a top surface divided into separate squares forming ten distinct shapes ranging from a single square to ten composite multiple squares for illustrating the numbers from one to ten, in which said single square and each square of said multiple squares are of the same size, said composite multiple squares being arranged in rows of two in side by side relation whereby even numbered members are squares or rectangles divided into an even number of identical squares and odd numbered members comprise an even numbered member with a single square integral therewith and projecting from the end of one of the rows of side by side squares, each of said plate members having a bottom surface divided identically to the top surface and bearing a color different therefrom, said plate members being adapted to teach arithmetic relations by fitting end to end for addition and stacking for subtraction, a series of individual square tiles, certain ones bearing positive numbers from one to ten on one surface and negative numbers from one to ten on the reverse surface and certain other ones having arithmetic symbols printed on one surface, and a pair of thin elongated rectangular members divided into evenly spaced increments, one bearing even numbers from one to ten and the other bearing identical increments and bearing negative numbers from one to ten.

2. A kit of materials according to claim 1 in which the odd numbered members illustrating the numbers five, seven and nine have said projecting single square movably supported thereon for movement from one row to the other for convenience in the teaching of negative numbers and subtraction.

3. A kit of materials according to claim 1 further including a square member with the indicia "n" thereon, indicating the unknown.

4. A kit of materials according to claim 1 further including labels bearing the names odd and even.

5. A kit of materials according to claim 1 further including a square frame member for representing an unknown number.

6. A kit of materials according to claim 5 further including a thin rectangular member bearing a different color on each side and having one pointed end.

7. A kit of materials according to claim 6 further including a set of printed worksheets having mathematical problems corresponding to concepts taught by said materials.

8. A kit of materials according to claim 7 further including a teachers manual for instructing teachers in the application and use of said materials.

9. A kit of materials according to claim 8 further including a container and lid for storage of said materials.

10. A kit of materials according to claim 1, further including a container for storage of said materials, a teachers manual for instructing teachers in the application and use of said materials, a set of printed worksheets or booklet having mathematical problems corresponding to concepts taught by said materials.

11. A kit of materials according to claim 10 in which said plate members have a bottom surface of different texture from the top surface.

12. A kit of materials according to claim 11 further including a series of individual square tiles, certain ones bearing positive numbers from one to ten on one surface and negative numbers from one to ten on the reverse surface and others having arithmetic symbols printed on one surface.

13. A kit of materials according to claim 12 further including a pair of thin elongated rectangular members divided into evenly spaced increments, one bearing positive numbers from one to ten and the other bearing identical increments and bearing negative numbers from one to ten.

14. A kit of materials according to claim 13 further including a square frame member for representing an unknown number.

15. A kit of materials for teaching mathematics comprising a container for storage of said materials, a teachers manual for instructing teachers in the application and use of said materials, a set of printed worksheets or booklet having mathematical problems corresponding to concepts taught by said materials, two identical sets of individual thin rectangular and square plate members each bearing a different color and having a top surface divided into separate squares forming ten distinct shapes ranging from a single square to ten composite multiple squares for illustrating the numbers from one to ten, each of said plate members having a bottom surface divided identically to the top surface and bearing a color different therefrom, a series of individual square tiles, certain ones bearing positive numbers from one to ten on one surface and negative numbers from one to ten on the reverse surface and others having arithmetic symbols printed on one surface, a pair of thin elongated rectangular members divided into evenly spaced increments, one bearing positive numbers from one to ten and the other bearing identical increments and bearing negative numbers from one to ten, a square frame member for representing an unknown number, and a thin rectangular member bearing a different color on each side and having one pointed end.

16. A kit of materials according to claim 15 in which said plate members have a bottom surface of different texture from the top surface.

* * * * *